United States Patent
Fujiwara et al.

(10) Patent No.: US 9,975,433 B2
(45) Date of Patent: May 22, 2018

(54) ELECTRIC VEHICLE CONTROLLER

(71) Applicant: Mitsubishi Electric Corporation, Chiyoda-ku, Tokyo (JP)

(72) Inventors: Hiroshi Fujiwara, Tokyo (JP); Yuri Yamamoto, Tokyo (JP); Yu Hirayama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/502,888

(22) PCT Filed: Aug. 25, 2014

(86) PCT No.: PCT/JP2014/072145
§ 371 (c)(1),
(2) Date: Feb. 9, 2017

(87) PCT Pub. No.: WO2016/030941
PCT Pub. Date: Mar. 3, 2016

(65) Prior Publication Data
US 2017/0232847 A1    Aug. 17, 2017

(51) Int. Cl.
*G05B 11/28* (2006.01)
*B60L 3/04* (2006.01)
(Continued)

(52) U.S. Cl.
CPC ............ *B60L 3/04* (2013.01); *B60L 7/04* (2013.01); *B60L 9/04* (2013.01); *H02P 3/12* (2013.01);
(Continued)

(58) Field of Classification Search
CPC .... H02M 2001/123; H02P 27/06; H02P 3/22; H02P 29/02; H02P 3/12; B60L 3/003;
(Continued)

(56) References Cited

U.S. PATENT DOCUMENTS 5,291,106 A * 3/1994 Murty ............... H02P 6/28
318/370
5,420,491 A * 5/1995 Kanzaki ............ B66B 1/30
318/376
(Continued)

FOREIGN PATENT DOCUMENTS

JP    62-33689 U    2/1987
JP    62-247701 A   10/1987
(Continued)

OTHER PUBLICATIONS

International Search Report (PCT/ISA/210) dated Nov. 4, 2014, by the Japanese Patent Office as the International Searching Authority for International Application No. PCT/JP2014/072145.
(Continued)

*Primary Examiner* — Bentsu Ro
*Assistant Examiner* — Thai Dinh
(74) *Attorney, Agent, or Firm* — Buchanan Ingersoll & Rooney PC

(57) ABSTRACT

An electric vehicle controller includes an inverter that drives a motor by receiving power supplied from an overhead line, a brake chopper circuit that includes a switching device and a braking resistor and is connected in parallel with the inverter, a voltage detector that detects a bus voltage applied to DC buses, and a control unit that performs power consumption control of causing the braking resistor to consume regenerative power supplied from the motor and overvoltage suppression control of suppressing the bus voltage from being excessive. The control unit controls the switching device such that a second duty ratio used at the time of performing the overvoltage suppression control is lower than a first duty ratio used at the time of performing the power consumption control.

4 Claims, 4 Drawing Sheets

(51) Int. Cl.
  *B60L 7/04* (2006.01)
  *B60L 9/04* (2006.01)
  *H02P 3/12* (2006.01)

(52) U.S. Cl.
  CPC ... *B60L 2240/526* (2013.01); *B60L 2240/527* (2013.01); *B60Y 2200/91* (2013.01)

(58) Field of Classification Search
  CPC ...... B60L 3/04; B60L 11/005; B60L 2210/40; B60L 3/0076; B60L 7/10; B60L 11/1811; B60L 2240/527; B60L 7/04; B60L 9/04; B60L 9/22
  USPC ....... 318/599, 606, 722, 375, 376, 811, 432, 318/434, 459
  See application file for complete search history.

(56) References Cited

U.S. PATENT DOCUMENTS

| | | | | |
|---|---|---|---|---|
| 7,170,245 B2* | 1/2007 | Youm | ............... | H02M 7/53875 318/268 |
| 7,633,249 B2* | 12/2009 | Sekimoto | ............... | H02M 5/458 318/254.1 |
| 2009/0284199 A1* | 11/2009 | Kitanaka | ................ | H02M 1/12 318/400.24 |

FOREIGN PATENT DOCUMENTS

| | | |
|---|---|---|
| JP | 3-135304 A | 6/1991 |
| JP | 3-159501 A | 7/1991 |
| JP | 4-197003 A | 7/1992 |
| JP | 11-166744 A | 6/1999 |
| JP | 2000-358384 A | 12/2000 |
| JP | 2008-228451 A | 9/2008 |

OTHER PUBLICATIONS

Written Opinion (PCT/ISA/237) dated Nov. 4, 2014, by the Japanese Patent Office as the International Searching Authority for International Application No. PCT/JP2014/072145.

* cited by examiner

ELECTRIC VEHICLE CONTROLLER

FIELD

The present invention relates to an electric vehicle controller having an overvoltage suppression function.

BACKGROUND

In the event that a voltage applied from a substation becomes excessive, an electric vehicle controller stops the operation of an inverter, opens a line breaker usually provided on a power supply path to an electric vehicle, and electrically separates the substation and the inverter in order to protect a switching device used in the inverter and a brake chopper circuit against the overvoltage. At this time, an overvoltage suppression thyristor is ignited to discharge an electrical charge in a filter capacitor via an overvoltage suppression resistor connected in series with the overvoltage suppression thyristor. As a result of these controls, the electrical charge in the filter capacitor is consumed in the overvoltage suppression resistor, thus the voltage of the filter capacitor drops.

Patent Literature 1 is an example of a conventional technology pertaining to the electric vehicle controller having the overvoltage suppression function. According to Patent Literature 1, current flowing through the overvoltage suppression resistor is commensurate with regenerative power at the time of regenerative braking, which can thus be continued without voltage being excessive.

Note that while Patent Literature 1 only discloses the overvoltage suppression function, it is common for an ordinary electric vehicle to have a configuration including a brake chopper circuit consuming the regenerative power together with an overvoltage suppression circuit as disclosed in Patent Literature 2, for example.

CITATION LIST

Patent Literature

Patent Literature 1: Japanese Patent Application Laid-Open No. H3-159501
Patent Literature 2: Japanese Patent Application Laid-Open No. 2000-358384

SUMMARY

Technical Problem

Patent Literature 2 discloses a configuration of achieving commonality between the overvoltage suppression resistor and a generated energy absorbing resistor but has not achieved commonality between the overvoltage suppression circuit and the brake chopper circuit, namely has not achieved an omission of either one of the overvoltage suppression circuit and the brake chopper circuit. The commonality between the overvoltage suppression circuit and the brake chopper circuit can greatly contribute to reduction in size of a device and is thus much desired in terms of cost reduction, improved maintainability and the like.

Moreover, the current flowing through the overvoltage suppression resistor is restricted as described above in Patent Literature 1 for the reason of not unnecessarily operating a device detecting an amount of change in the current ΔI that is usually provided in a substation (such device will be hereinafter referred to as a "ΔI detector"). The operation of the ΔI detector leads to tripping of a breaker in the substation. Tripping of the breaker in the substation causes a considerable influence on the vehicle operation since the operation of not only an own vehicle but also other vehicles are stopped.

The unnecessary operation of the ΔI detector is caused not only at the time of the regenerative braking but also by a sudden change in voltage of an overhead line, for example. When overvoltage is generated by the sudden change in voltage of the overhead line, the operation of the inverter is stopped, the line breaker is opened, and the brake chopper circuit is operated as described above. In reality, however, the brake chopper circuit is turned on before the line breaker is opened due to a delayed mechanical operation of the line breaker. This causes current to flow from a power supply source to the brake chopper circuit through the line breaker at the same time as the brake chopper circuit being turned on so that the ΔI detector in the substation may be operated to possibly cause unnecessary tripping of the breaker in the substation, where this event has been a problem.

The present invention has been made in consideration of the aforementioned problem, where an object of the invention is to obtain an electric vehicle controller capable of preventing an unintended and unnecessary operation of the breaker in the substation while achieving commonality between the overvoltage suppression circuit and the brake chopper circuit.

Solution to Problem

To solve the above described problem and achieve the object an electric vehicle controller according to the present invention includes: an inverter to drive a motor by receiving power supplied via a line breaker and a DC bus; a power consumption circuit to be connected in parallel with the inverter while including a switching device and a power consumption resistor connected in series with the switching device; a voltage detector to detect a bus voltage applied to the DC bus; and a control unit to perform power consumption control that causes the power consumption resistor to consume regenerative power supplied from the motor and overvoltage suppression control that suppresses the bus voltage from being excessive. The control unit controls the switching device in order for a second duty ratio used at the time of performing the overvoltage suppression control to be lower than a first duty ratio used at the time of performing the power consumption control.

Advantageous Effects of Invention

The effect of the present invention is that the unintended and unnecessary operation of the breaker in the substation can be prevented while achieving commonality between the overvoltage suppression circuit and the brake chopper circuit.

DESCRIPTION OF EMBODIMENTS

There will now be described an electric vehicle controller according to an embodiment of the present invention with reference to the drawings. Note that the present invention is not to be limited by the following embodiment.

Embodiment.

Figure 1:
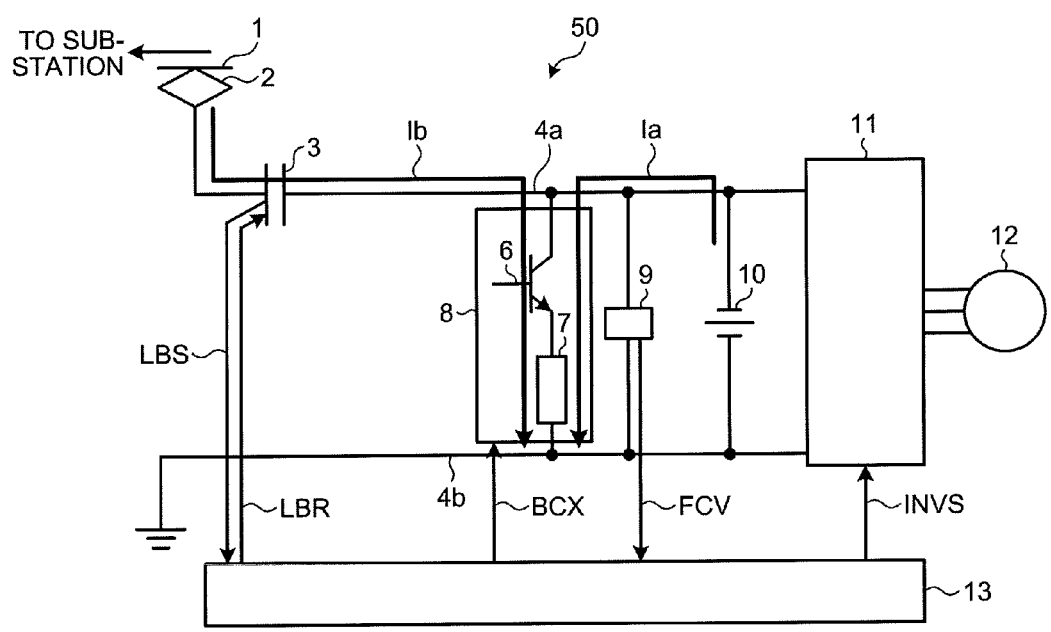
FIG. 1 is a diagram illustrating an example of the configuration of an electric vehicle controller according to an embodiment.

FIG. 1 is a diagram illustrating an example of the configuration of an electric vehicle controller according to an embodiment. As illustrated in FIG. 1, an electric vehicle controller 50 according to the embodiment is configured to receive DC (direct current) power from an overhead line 1 via a current collector 2 and a line breaker 3, convert the received DC power into AC (alternative current) power by using an inverter 11, and drive a motor 12 being a load.

In addition to the inverter 11, the electric vehicle controller 50 is configured to include a brake chopper circuit 8 in which a switching device 6 and a braking resistor 7 are connected in series, and a filter capacitor 10 that accumulates power supplied from the overhead line 1. One end of the brake chopper circuit 8 is connected to a DC bus 4a on a high potential side, while another end of the brake chopper circuit 8 is connected to a DC bus 4b on a low potential side. Likewise, the filter capacitor 10 is connected between the DC buses 4a and 4b. Also a voltage detector 9 which detects applied voltage from the overhead line or voltage of the filter capacitor 10 is provided between the DC buses 4a and 4b. A filter capacitor voltage FCV being information of the voltage across the filter capacitor 10 detected by the voltage detector 9 is input to a control unit 13. The control unit 13 uses the filter capacitor voltage FCV to control the inverter 11, the brake chopper circuit 8, and the line breaker 3.

Figure 4:
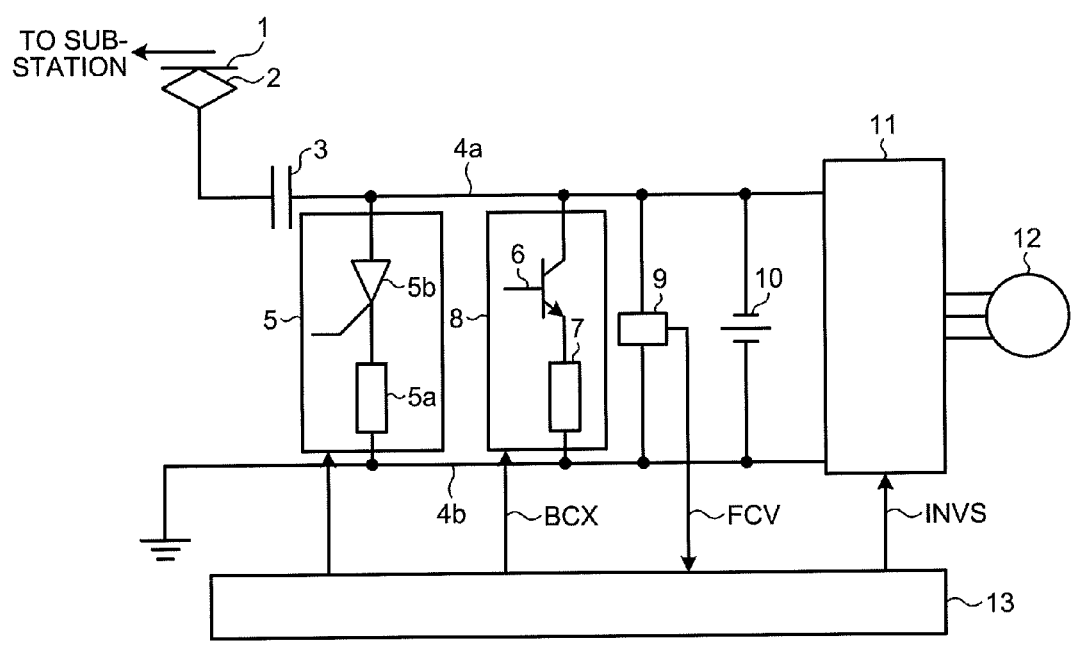
FIG. 4 is a diagram illustrating the configuration of a general electric vehicle controller employing an overvoltage suppression circuit.

FIG. 4 is an example of the configuration of an electric vehicle controller illustrated as a comparative example, the configuration being illustrated as a conventional configuration in Patent Literature 2, for example. In FIG. 4, a part identical or equivalent to a part in FIG. 1 is indicated with the same reference numeral as that assigned to the part in FIG. 1. As is apparent from a comparison between FIG. 1 and FIG. 4, an overvoltage suppression circuit 5 is omitted in the electric vehicle controller 50 according to the embodiment. In the electric vehicle controller 50 according to the embodiment, a function that the overvoltage suppression circuit 5 takes charge of is substituted by the brake chopper circuit 8 operated under control of the control unit 13. That is, the brake chopper circuit 8 of the embodiment operates as a power consumption circuit having a combination of an overvoltage suppression function and a regenerative power consumption function included in an original brake chopper circuit, while the braking resistor 7 provided in the brake chopper circuit 8 operates as a power consumption resistor. Note that the function substituted by the brake chopper circuit 8 will be described in detail later on.

Next, there will be described differences between the overvoltage suppression circuit 5 and the brake chopper circuit 8 with reference to the configuration in FIG. 4. The design concept is different in the first place between the overvoltage suppression circuit 5 and the brake chopper circuit 8, where this difference in the design concept is expressed as a difference between the overvoltage suppression resistor 5a and the braking resistor 7. The overvoltage suppression resistor 5a is provided for the purpose of discharging an electrical charge in the filter capacitor 10 when voltage applied from the overhead line 1 becomes excessive. The operation of the overvoltage suppression circuit 5 is designed while considering coordination with a substation, specifically such that a ΔI detector in the substation does not operate even when an overvoltage suppression thyristor 5b is ignited before opening the line breaker 3.

On the other hand, the braking resistor 7 is designed such that surplus power of regenerative power supplied from the motor 12 can be consumed quickly without waste. At this time, a resistance value R1 of the overvoltage suppression resistor 5a and a resistance value R2 of the braking resistor 7 are generally in a relationship of R1>R2. This causes larger current to flow in from the substation when the brake chopper circuit 8 is used in performing overvoltage suppression control, thereby possibly causing the ΔI detector to operate to be a cause of the problem in the electric vehicle controller having the overvoltage suppression function.

Figure 2:
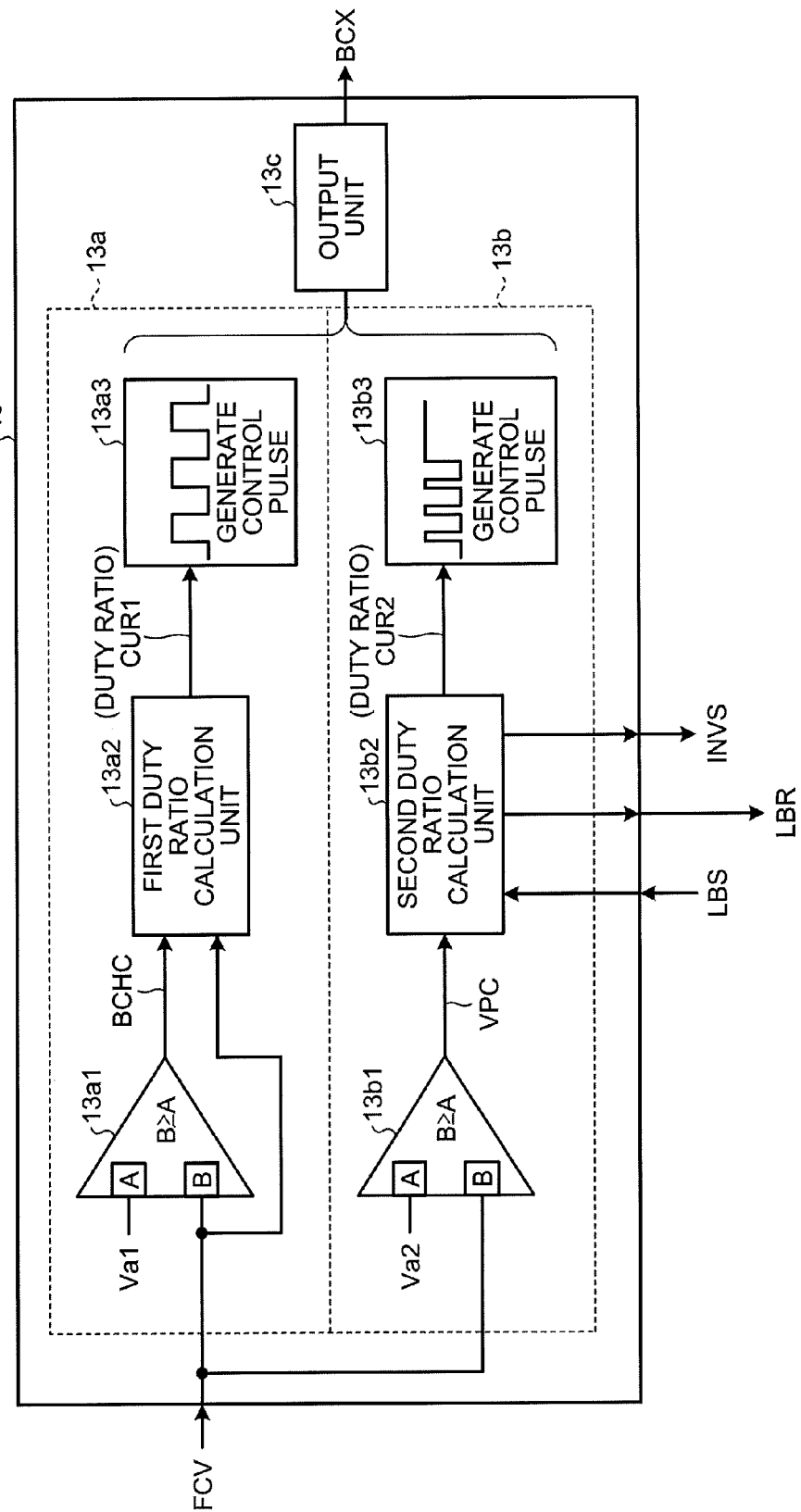
FIG. 2 is a diagram illustrating an example of the configuration of a control unit in the electric vehicle controller according to an embodiment.

Therefore, the electric vehicle controller 50 according to the embodiment realizes the configuration of a control system not allowing the ΔI detector to operate even when the brake chopper circuit 8 is used as the overvoltage suppression circuit, where FIG. 2 is a diagram illustrating an example of the configuration of the control system.

FIG. 2 illustrates the configuration including a first control system 13a pertaining to brake chopper control in an upper tier and a second control system 13b pertaining to overvoltage suppression control in a lower tier. The first control system 13a includes a first comparator 13a1, a first duty ratio calculation unit 13a2 and a first drive signal generation unit 13a3, while the second control system 13b includes a second comparator 13b1, a second duty ratio calculation unit 13b2 and a second drive signal generation unit 13b3. Moreover, an output unit 13c is provided in an output stage of the control unit 13.

There will now be described the operation of each of the first control system 13a and the second control system 13b.

(First Comparator)

The first comparator 13a1 receives the filter capacitor voltage FCV detected by the voltage detector 9 at a B terminal and a first overvoltage determination value Va1 indicating a starting voltage of brake chopper control at an A terminal. The first comparator 13a1 compares the filter capacitor voltage FCV with the first overvoltage determination value Va1 and outputs a brake chopper control command BCHC to the first duty ratio calculation unit 13a2 when the filter capacitor voltage FCV is higher than or equal to the first overvoltage determination value Va1.

(Second Comparator)

The second comparator 13b1 receives the filter capacitor voltage FCV at a B terminal similarly to the first comparator 13a1, and receives a second overvoltage determination value Va2 indicating a starting voltage of overvoltage protection control at an A terminal of the second comparator 13b1. The second comparator 13b1 compares the filter capacitor voltage FCV with the second overvoltage determination value Va2 and outputs an overvoltage protection command VPC to the second duty ratio calculation unit 13b2 when the filter capacitor voltage FCV is higher than or equal to the second overvoltage determination value Va2. Note that the first overvoltage determination value Va1 and the second overvoltage determination value Va2 are in a relationship of Va1<Va2. Accordingly, the brake chopper control command BCHC is generated before the overvoltage protection command VPC is generated while the filter capacitor voltage FCV is in the process of increasing, for example.

(First Duty Ratio Calculation Unit)

The first duty ratio calculation unit 13a2 receives the filter capacitor voltage FCV and the brake chopper control command BCHC generated by the first comparator 13a1. While receiving the brake chopper control command BCHC, the first duty ratio calculation unit 13a2 calculates a duty ratio CUR1 being a first duty ratio corresponding to the magnitude of the filter capacitor voltage FCV and outputs the duty ratio to the first drive signal generation unit 13a3. Note that the duty ratio represents a ratio of an on-period occupying the duration of one cycle of an on-pulse and an off-pulse at the time of controlling the switching device 6.

(Second Duty Ratio Calculation Unit)

The second duty ratio calculation unit 13b2 receives the overvoltage protection command VPC generated by the second comparator 13b1 and a line breaker state signal LBS from the line breaker 3. Note that the line breaker state signal LBS in this case will be described as one that is output when the line breaker 3 is closed. While receiving the overvoltage protection command VPC and the line breaker state signal LBS, the second duty ratio calculation unit 13b2 calculates a duty ratio CUR2 being a second duty ratio and outputs it to the second drive signal generation unit 13b3 while at the same time outputting a line breaker release command LBR provided to release the line breaker 3 and an inverter operation stop command INVS provided to stop the operation of the inverter 11 to the line breaker 3 and the inverter 11, respectively. Note that the duty ratio CUR2 output by the second duty ratio calculation unit 13b2 and the duty ratio CUR1 output by the first duty ratio calculation unit 13a2 are in a relationship of CUR2<CUR1.

The line breaker 3 is opened when a line breaker release command LBR is input to the line breaker 3. The line breaker state signal LBS is not output once the line breaker 3 is opened. When the line breaker state signal LBS is lost from the state in which both the overvoltage protection command VPC and the line breaker state signal LBS are input, the second duty ratio calculation unit 13b2 sets the duty ratio CUR2 to a third duty ratio higher in value than the duty ratio CUR1. It suffices the third duty ratio is higher than the duty ratio CUR1 being the first duty ratio. Note that the line breaker 3 is open at the time the third duty ratio is generated, whereby no current flows in from the overhead line 1. Accordingly, the braking resistor 7 can consume power quickly by setting the third duty ratio to 100%, for example, unless the regenerative power of the motor 12 is excessive.

(First Drive Signal Generation Unit)

The first drive signal generation unit 13a3 receives the duty ratio CUR1 calculated by the first duty ratio calculation unit 13a2. The first drive signal generation unit 13a3 generates a control pulse to drive the switching device 6 of the brake chopper circuit 8 according to the duty ratio CUR1.

(Second Drive Signal Generation Unit)

The second drive signal generation unit 13b3 receives the duty ratio CUR2 calculated by the second duty ratio calculation unit 13b2. The second drive signal generation unit 13b3 generates a control pulse to drive the switching device 6 of the brake chopper circuit 8 according to the duty ratio CUR2.

(Output Unit)

The control pulse generated by the first drive signal generation unit 13a3 and the control pulse generated by the second drive signal generation unit 13b3 are input to the output unit 13c. When both of the control pulses are generated, the output unit 13c performs processing by prioritizing the control pulse generated by the second drive signal generation unit 13b3 and outputs the processed control pulse to the brake chopper circuit 8 as a brake chopper operation command BCX, whereby the switching device 6 of the brake chopper circuit 8 is controlled.

Figure 3:
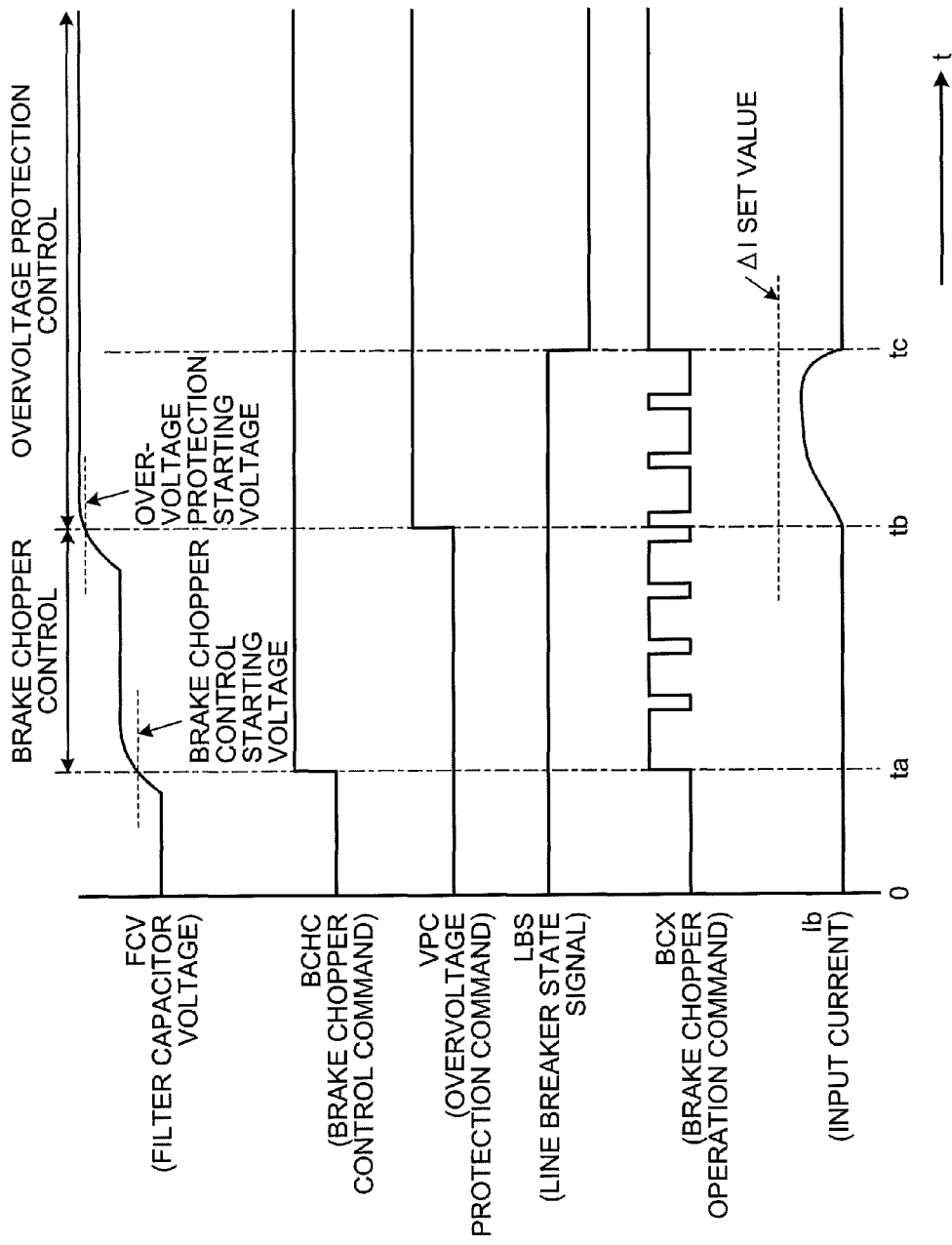
FIG. 3 is a time chart used to describe an operation of the electric vehicle controller according to an embodiment.

Next, an operation performed when the overvoltage is detected by the electric vehicle controller of the embodiment will be described with reference to FIGS. 1, 2 and 3. FIG. 3 is a time chart used to describe the operation performed when the overvoltage is detected by the electric vehicle controller. The time chart of FIG. 3 illustrates the waveform of each of the filter capacitor voltage FCV, the brake chopper control command BCHC, the overvoltage protection command VPC, the line breaker state signal LBS, the brake chopper operation command BCX, and an input current Ib flowing in from the overhead line 1 in order from the upper side.

When the voltage applied from the overhead line 1 becomes excessive, the voltage detector 9 detects an overvoltage state. Since the control unit 13 of the electric vehicle controller 50 according to the embodiment is configured as illustrated in FIG. 2, it is determined at time ta that the filter capacitor voltage FCV exceeds a brake chopper control starting voltage (corresponding to the first overvoltage determination value Va1 in FIG. 2). At this time, the control unit 13 performs the aforementioned operation to output the brake chopper operation command BCX expressed as a control pulse signal that is turned on and off with the duty ratio CUR1, whereby filter capacitor current Ia from the filter capacitor 10 flows into the brake chopper circuit 8 as illustrated in FIG. 1. On the other hand, the switching device 6 being controlled to be turned-on and turned-off suppresses the influx of the input current Ib from the overhead line 1 into the brake chopper circuit 8, whereby the ΔI detector does not operate.

When the filter capacitor voltage FCV further increases, it is determined at time tb that the filter capacitor voltage FCV exceeds an overvoltage protection starting voltage (corresponding to the second overvoltage determination value Va2 in FIG. 2) so that the overvoltage protection command VPC is output. The line breaker release command LBR is output when the overvoltage protection command VPC is output, but the line breaker 3 is not opened immediately due to a delay in a mechanical operation as expressed by the line breaker state signal LBS. Until the line breaker 3 is opened (from time tb to time tc), the control unit 13 controls the switching device 6 by outputting the brake chopper operation command BCX expressed as a control pulse signal that is turned-on and turned-off with the duty ratio CUR2 having a reduced duty ratio. At this time, the input current Ib flows from the overhead line 1 but can be suppressed so as not to exceed a ΔI set value being a determination threshold since the duty ratio is reduced.

The input current Ib does not flow after time tc at which the line breaker 3 is opened, so that the duty ratio is changed to 100% to quickly discharge the electrical charge in the filter capacitor 10.

Note that the duty ratio during the time from when the line breaker release command LBR is output to when the line breaker 3 is opened can be determined according to the ΔI set value, the resistance value of the braking resistor 7, an overvoltage set value, and the number of electric vehicle controllers. With Rb denoting the resistance value of the braking resistor 7 and n denoting the number of electric vehicle controllers per formation, the resistance value Rb of the braking resistor can be determined on the basis of the following expression, for example.

$$Rb \geq n \times Va2 / (\Delta I \text{ set value})$$

As has been described, the electric vehicle controller according to the embodiment can realize commonality between the overvoltage suppression circuit and the brake chopper circuit, thus it becomes possible to reduce size and cost of the controller.

Moreover, according to the electric vehicle controller of the embodiment, the switching device is controlled such that the second duty ratio at the time of performing overvoltage suppression control is lower than the first duty ratio at the time of performing brake chopper control, whereby an unintended and unnecessary operation of the breaker in the substation can be suppressed while realizing commonality between the overvoltage suppression circuit and the brake chopper circuit.

Furthermore, the electric vehicle controller according to the embodiment performs control to increase the duty ratio after making sure that the line breaker is opened, whereby the electrical charge in the filter capacitor can be discharged quickly while suppressing the unintended and unnecessary operation of the breaker in the substation.

Note that the configuration illustrated in the aforementioned embodiment is merely an example of the configuration of the preset invention, where it is needless to say that the configuration can be combined with another known technique or modified by omitting a part of the configuration or the like without departing from the gist of the present invention.

INDUSTRIAL APPLICABILITY

As has been described, the present invention is useful as the electric vehicle controller having the overvoltage suppression function.

REFERENCE SIGNS LIST 1 overhead line, 2 current collector, 3 line breaker, 4a, 4b DC bus, 5 overvoltage suppression circuit, 6 switching device, 7 braking resistor (power consumption resistor), 8 brake chopper circuit (power consumption circuit), 9 voltage detector, 10 filter capacitor, 11 inverter, 12 motor, 13 control unit, 13a first control system, 13a1 first comparator, 13b1 second comparator, 13a2 first duty ratio calculation unit, 13b2 second duty ratio calculation unit, 13a3 first drive signal generation unit, 13b3 second drive signal generation unit, 13c output unit, 50 electric vehicle controller, BCHC brake chopper control command, CUR1 duty ratio (first duty ratio), CUR2 duty ratio (second duty ratio), FCV filter capacitor voltage, INVS inverter operation stop command, LBR line breaker release command, LBS line breaker state signal, VPC overvoltage protection command, Va1 first overvoltage determination value, Va2 second overvoltage determination value.

The invention claimed is:

1. An electric vehicle controller comprising:
   an inverter to drive a motor by receiving power supplied via a line breaker and a DC bus;
   a power consumption circuit to be connected in parallel with the inverter while including a switching device and a power consumption resistor connected in series with the switching device;
   a voltage detector to detect a bus voltage applied to the DC bus; and
   a control unit to perform power consumption control that causes the power consumption resistor to consume regenerative power supplied from the motor and overvoltage suppression control that suppresses the bus voltage from being excessive, wherein
   the control unit controls the switching device in order for a second duty ratio used at the time of performing the overvoltage suppression control to be lower than a first duty ratio used at the time of performing the power consumption control.

2. The electric vehicle controller according to claim 1, wherein
   the control unit includes a first control system to perform the power consumption control and a second control system to perform the overvoltage suppression control,
   the control unit starts an operation of the first control system when the bus voltage is higher than or equal to a first determination value and starts an operation of the second control system when the bus voltage is higher than or equal to a second determination value that is larger than the first determination value, and
   the operation of the second control system is prioritized when the first control system and the second control system are operated at the same time.

3. The electric vehicle controller according to claim 2, wherein
   the second control system receives information to open or close the line breaker, and
   the second control system calculates a third duty ratio larger than the first duty ratio when acknowledging the information to open or close the line breaker and controls the switching device according to the third duty ratio.

4. The electric vehicle controller according to claim 3, wherein the third duty ratio equals 100%.

* * * * *